Patented Jan. 10, 1950

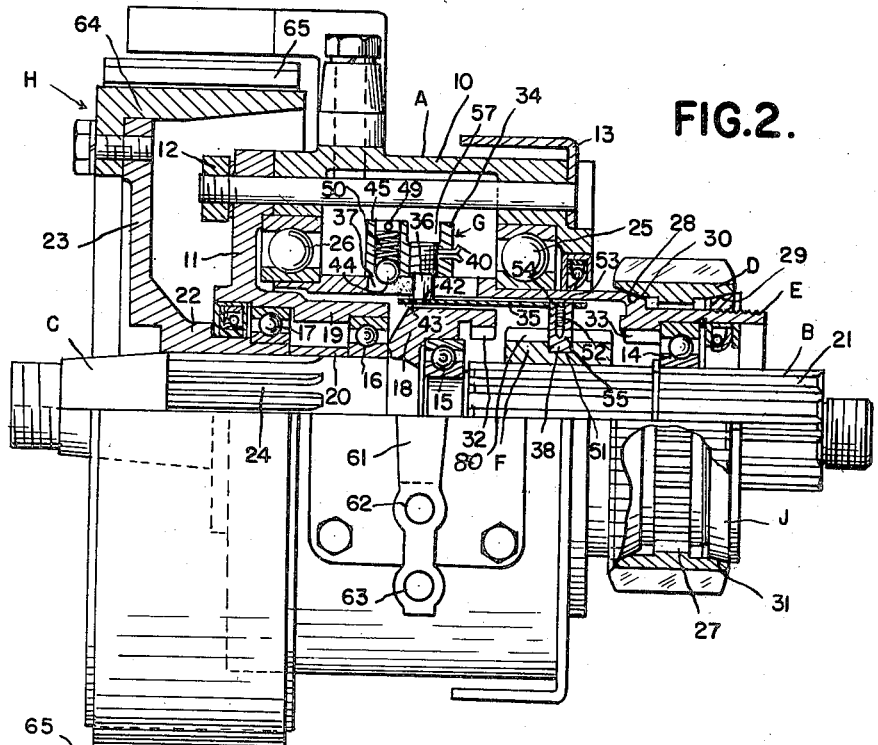

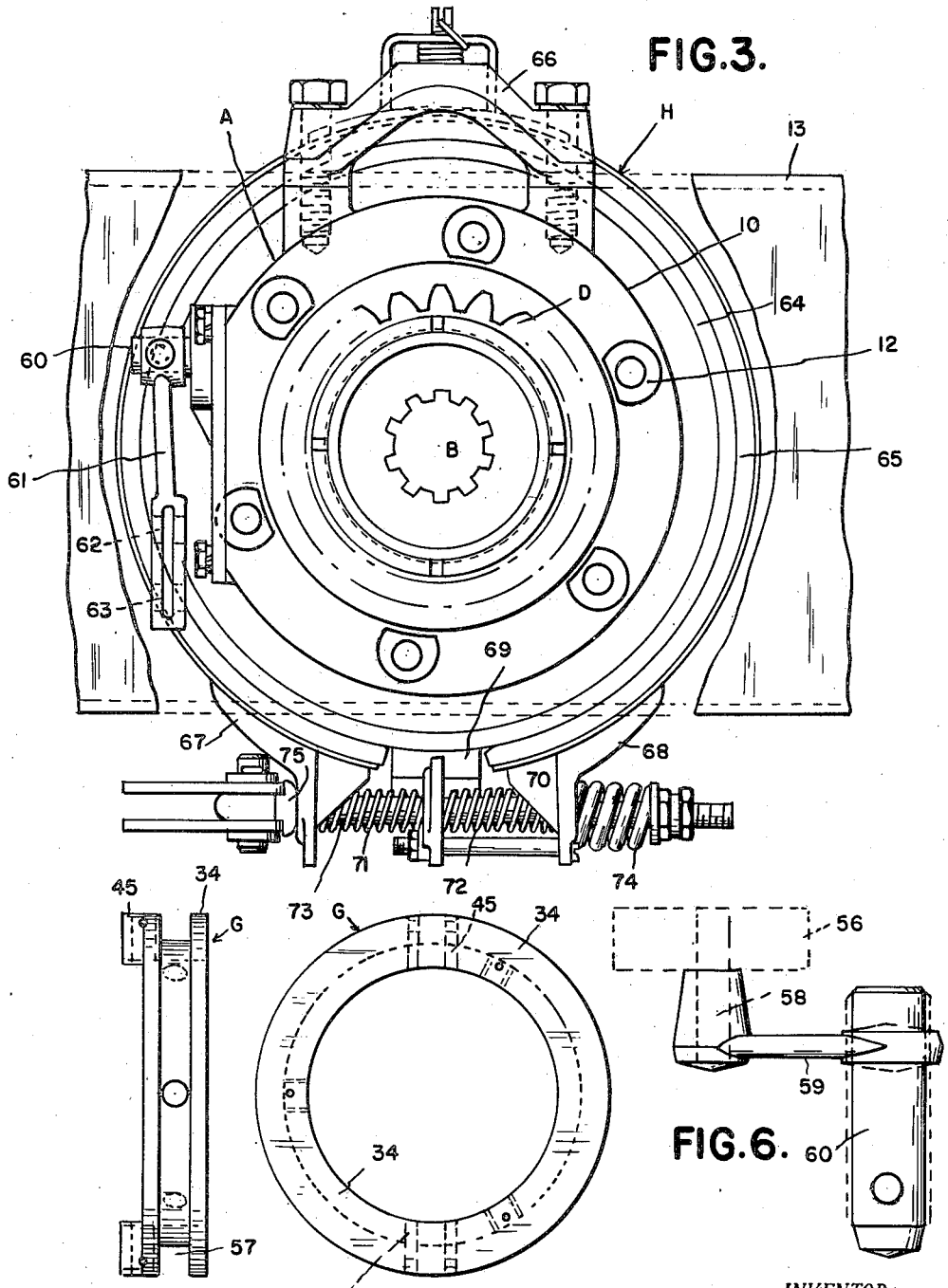

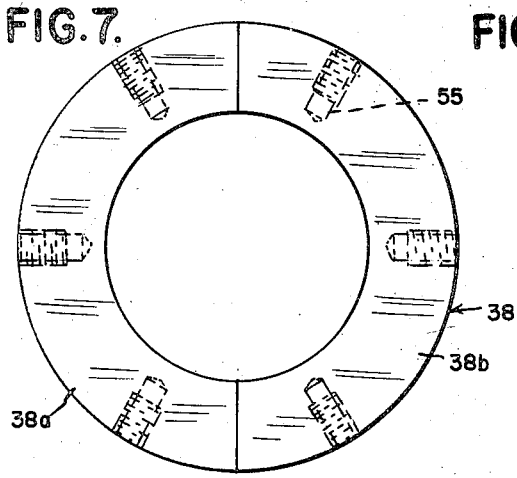
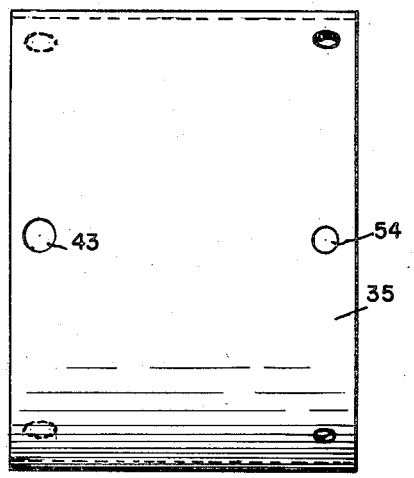
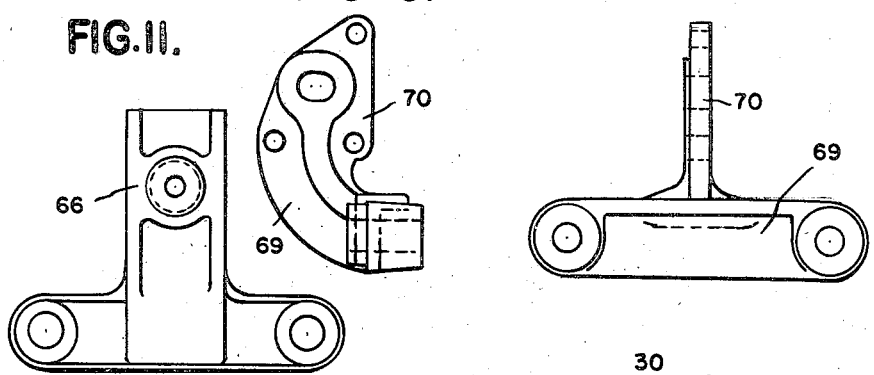
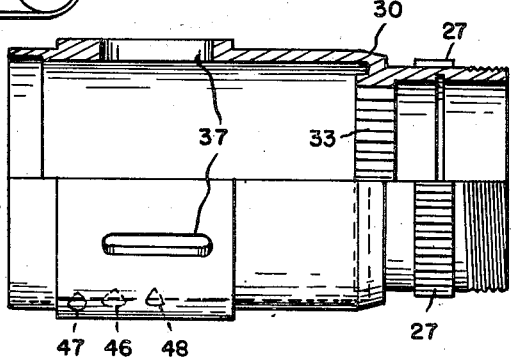

2,494,111

UNITED STATES PATENT OFFICE 2,494,111

POWER TAKE-OFF STRUCTURE

Robert W. Wagner, Chelsea, Mich.

Application October 19, 1944, Serial No. 559,348

4 Claims. (Cl. 74—15.88)

This invention relates generally to power take-off units and refers more particularly to split shaft power take-off units for motor vehicles such as trucks, tractors and the like. One of the essential objects of the invention is to provide a unit of the type mentioned that has a shorter over-all length so it can be installed in restricted spaces where conventional power take-off units cannot be installed.

Another object is to provide a power take-off unit wherein provision is made for disconnecting the drive to the rear axle of the motor vehicle.

Another object is to provide a power take-off unit having brake mechanism for the driven section of the shaft.

Another object is to provide a power take-off unit that is simple in construction, economical to manufacture, easy to install and efficient in operation.

Other objects, advantages and novel details of construction of this invention will be made more apparent as this description proceeds, especially when considered in connection with the accompanying drawings, wherein:

Figure 1 is a side elevation of a power take-off unit embodying my invention and showing by dotted lines alternate positions of the shifter mechanism actuating lever;

Figure 2 is a view similar to Figure 1, with parts broken away and in section;

Figure 3 is an end view of the unit illustrated in Figure 1;

Figure 4 is a detailed elevational view of the shifter ring;

Figure 5 is an edge elevational view of the ring illustrated in Figure 4;

Figure 6 is an elevational view of a shifter arm and shifter ring shoe;

Figure 7 is an elevational view of the sectional collar;

Figure 8 is a detailed elevational view of the shifting tube;

Figures 9 and 10 respectively are detail views of the brake locating bracket;

Figure 11 is a detail view of the brake anchor bracket; and

Figure 12 is a detail view of the supporting sleeve for the power take-off element, with parts broken away and in sections.

Referring now to the drawings, I have illustrated a preferred form of power take-off unit wherein A is the housing, B and C respectively are the drive and driven sections of a propeller shaft, D is the power take-off element, E is a supporting sleeve for said element, F is the shiftable clutch member for alternately coupling the driven section C of the shaft and the power take-off element D to the drive section B of the shaft, G is shifter mechanism for the clutch member F, and H is the brake mechanism for the driven section C of the shaft.

As shown, the housing A is relatively small and short so as to be conveniently mounted in a restricted space of the motor vehicle and serves as a support for the brake mechanism H. Preferably the housing A has a body portion 10 and a cap portion 11 held together by bolts 12 that are also employed to connect the housing to a supporting channel member 13 rigid with the frame of the motor vehicle.

The drive and driven sections B and C respectively of the shaft are in alignment and are journalled in suitable bearings 14, 15, 16 and 17 respectively. Preferably the bearings 14 for the drive section B are within and carried by the supporting sleeve E for the power take-off element D. The bearings 15 for the drive section are within and carried by an enlarged open inner end portion 18 of the driven section C of the shaft, and the bearings 16 and 17 for the driven section C are within and carried by an inwardly extending tubular part 19 of the cap 11 of the housing. Any suitable means such as the tubular spacer 20 may be sleeved on the driven section C between the bearings 16 and 17 to maintain the proper spaced relation therebetween.

Preferably the drive section B of the shaft projects endwise from the housing A and is splined at 21 for non-rotatable engagement with the hub of a companion flange (not shown) to which a universal joint (not shown) of the usual propeller shaft of the motor vehicle may be connected in any suitable manner. The driven section C also projects endwise from the housing and is splined at 24 for non-rotatable engagement with the hub 22 of a companion flange 23 to which a universal joint (not shown) of the usual drive mechanism for the rear axle of the motor vehicle may be connected in any suitable manner.

The power take-off element D may be a sprocket or a gear, as desired, and may be used to impart rotary motion to any suitable mechanism or appliance (not shown). The supporting sleeve E for the power take-off element D encircles the tubular part 19 of the cap and the enlarged open inner end portion 18 of the driven section C and is journaled in bearings 25 and 26 within and carried by the body portion 10 of the housing. Preferably the power take-off element D is provided at the center thereof with a multiple spline connection 27 with the sleeve E and is provided at opposite sides of such spline connection with beveled or inclined portions 28 and 29 respectively that engage correspondingly beveled or inclined portions 30 and 31 respectively of the sleeve E and of a clamping nut J. Thus the spline connection just mentioned will take the torque action of the power take-off element D, while the beveled portion engagement mentioned will take the radial action of the power take-off element.

The shiftable clutch member F for alternately coupling the driven section C of the shaft and the power take-off element D to the drive section B of the shaft is splined upon the drive section B between the bearings 14 and 15 and has clutch teeth 80 alternately engageable with clutch teeth 32 and 33 respectively integral with the enlarged inner end portion of the driven section C and with the supporting sleeve E for the power take-off element D.

The shifter mechanism G for the shiftable clutch member F preferably comprises a shifter ring 34 sleeved upon and movable lengthwise of the supporting sleeve E for the power take-off element, a shifting tube 35 inside the supporting sleeve E and substantially concentric with the enlarged inner end portion 18 of the driven section C of the shaft, three screws 36 anchored within the shifter ring 34 at circumferentially spaced points thereof and extending through a corresponding number of elongated longitudinally extending slots 37 in the supporting sleeve E for reciprocating the shifting tube 35, and a sectional shifting collar 38 actuable by the shifting tube 35 to move the clutch member F back and forth on the drive section B for alternate clutching engagement with the teeth 32 and 33 respectively.

Preferably the screws 36 are held against accidental displacement in the ring 34 by cotter pins 40 that extend through the screws 36 and engage suitable holes in the ring 34. The inner ends 42 of the screws are preferably reduced and engage circular holes 43 in the shifting tube 35. Any suitable means such as spring pressed balls 44 in diametrically opposed lateral enlargements 45 of the ring 34 and engageable with suitable depressions 46, 47 and 48 respectively in the supporting sleeve E may be employed for yieldably holding the shifter ring 34 in various shifted positions. Pins 49 extend through the enlargements 45 at the outer ends of the springs 50 to hold the springs and balls against displacement.

The sectional shifting collar 38 is preferably in two substantially identical halves 38ᵃ and 38ᵇ and engages a circumferentially extending groove 51 in the shiftable clutch member F. Screws 52 threadedly engage the sectional collar 38 at circumferentially spaced points thereof and have reduced inner end portions 53 that engage circular holes 54 in the shifting tube 35. Preferably the sockets 55 in the collar for the screws 52 are deeper than the screws so that the latter may initially be screwed all the way home in such sockets to permit the tube 35 to be slipped over the collar 38, then the screws 52 are adjusted outwardly to cause the reduced end portions 53 thereof to operatively engage the holes 54 in the shifting tube 35. When in this position, the screws 52 will establish a positive operating connection between the shifting tube 35 and the collar 38 for actuating the clutch member F back and forth.

For actuating the shifter ring 34 I have provided a shifter shoe 56 that engages a circumferentially extending channel 57 in the ring 34, a supporting pin 58 for said shoe, an inverted substantially L-shaped shifter arm 59 carrying the pin 58 and having a pivot portion 60 pivoted in the housing A, a shifter lever 61 connected at one end to the pivot portion 60 of the shifter arm 59 and provided at its other end with longitudinally spaced holes 62 and 63 respectively to which remote control shifting wires (not shown) for the lever may be selectively connected.

The brake mechanism H for the driven section C of the shaft is an external band type and is carried by the housing A and driven section C respectively of the power take-off unit. As shown, the brake drum 64 of such mechanism is fixed to the companion flange 23 splined upon the driven section C of the shaft, while the brake band 65 is supported from the housing A and engages the drum 64 in the usual manner. Preferably the brake band 65 is provided midway its ends with an anchor bracket 66 fastened to the housing A, and is provided at its free ends with suitable actuating brackets 67 and 68 respectively. A spring locating bracket 69 is also fastened to the housing A and has a web 70 between and serving as abutments for the retracting springs 71 and 72 of the brake mechanism. As usual, the springs 71 and 72 are located between the web 70 and brackets 67 and 68 and are sleeved on a rod 73 extending through the brackets 67 and 68. An abutment spring 74 is anchored on the rod 73 at the back of the bracket 68, while an actuator 75 for the brake band 65 is operatively connected to the rod 73 at the back of the bracket 67. Any suitable means (not shown) may be employed for operating the actuator 75 and rod 73 to move the brackets 67 and 68 toward each other against the tension of the springs 71 and 72 to contract the band 65 upon the drum 64.

In use, the lever 61 may be shifted from the circular full line neutral position to either of the inclined dotted line operating positions to cause the clutch member F to be shifted from its neutral position into clutching engagement with either the power take-off sleeve E or the driven section C of the shaft. For example, the lever 61 may be moved from its neutral position to shift the ring 34, tube 35 and clutch member F to the right so that the clutch member F will be in clutching engagement with the teeth 33 to thereby drive the sleeve E and power take-off element D or the lever 61 may be moved from its neutral position to shift the ring 34, tube 35 and clutch member F to the left so that the clutch member F will be in clutching engagement with the teeth 32 to thereby drive the driven section C of the shaft.

When the power take-off element D is driven, the drive to the rear axle (not shown) of the motor vehicle is disconnected. When the driven and drive sections of the shaft are connected together then the drive to the rear axle of the vehicle is complete and may be under the control of the brake mechanism H.

The channel 51 in the gear F provides relative rotary movement between the collar 38 and shiftable clutch member F when the latter is in neutral position or is in clutching engagement with the teeth 32 of the driven section, while the channel 57 in the shifter ring 34 provides relative rotary movement between the shifter shoe 56 and ring 34 when the clutch member F is in clutching engagement with the teeth 33 of the power take-off element.

What I claim as my invention is:

1. A power take-off unit having a propeller shaft provided with driving and driven sections, a power take-off sleeve concentric with said sections, means operable to connect either the sleeve or the driven section to the driving section, a nut on said sleeve, said nut and sleeve having opposed inclined portions, and a power take-off element on said sleeve between said opposed portions, said power take-off element being provided at the center thereof with a multiple splined connection with said sleeve and provided upon opposite sides of said splined connection with inclined portions engaging the inclined portions of said sleeve and nut.

2. A power take-off comprising a cylindrical housing, a sleeve journaled within said housing extending out through one end thereof with power transmission means on its outer portion, a head at the opposite end of said casing provided with a tubular portion extending centrally inward within said sleeve, a propeller shaft having aligned sections extending into said housing from opposite ends thereof into stepped engagement with each other, one of said shaft sections being journaled within said tubular portion and the other within said sleeve, clutch elements respectively on the outer of said stepped shaft sections and on said sleeve, a cooperating clutch element having a splined slidable engagement with the shaft section within said sleeve and engageable with the aforesaid clutch elements to alternatively couple said shaft sections to each other or the one section to said sleeve, and means operable from without said housing for actuating said slidable clutch element.

3. A power take-off comprising a cylindrical housing having bearings therewithin at opposite ends thereof, a sleeve journaled within said bearings and extending out from one end of said housing with power transmission means on the outer portion thereof, a head at the opposite end of said housing provided with a tubular portion extending centrally inward within said sleeve, a propeller shaft having aligned sections extending into said housing from opposite ends thereof into stepped engagement with each other, the one section being journaled in bearings within said tubular portion and the other in a bearing within said sleeve, clutch elements respectively on the outer of said stepped shaft sections and upon said sleeve, a cooperating clutch element having a splined slidable engagement with the shaft sections within said sleeve adapted to alternately couple said shaft with the other shaft or with said sleeve, and shifter mechanism for said slidable clutch element including a collar slidable upon said sleeve in the space within said housing between said bearings, a thin walled tube within said sleeve surrounding said shaft sections being coupled to said slidable clutch element and one or more connectors between said collar and said tube extending through longitudinal slots in said sleeve, and means for sliding said collar operable from without said housing.

4. A power take-off comprising a cylindrical housing having bearings therewithin at opposite ends thereof, a sleeve journaled within said bearings and extending out from one end of said housing with power transmission means on its outer portion, a head at the opposite end of said housing provided with a tubular portion extending centrally inward within said sleeve, a propeller shaft having aligned sections extending into said housing from opposite ends thereof into stepped engagement with each other, bearings in said tubular portion for the shaft section therewithin, a bearing for the shaft section within said sleeve, clutch elements respectively on the outer of said stepped shafts and said sleeve, a cooperating clutch element having a slidable splined engagement with the shaft section within the sleeve, a shifter mechanism including a collar slidable on said sleeve in the space within said housing between the bearings thereof, a thin walled tube within said sleeve surrounding said shaft sections and connected to said slidable clutch element, one or more connections between said collar and tube passing through longitudinal slots in said sleeve, means operable from without said housing for moving said collar, a channel beam support for said housing having its web portion secured thereto and its flanges overlapping the housing, and a brake drum secured to the shaft section at the opposite end of said housing, a flange of said drum overlapping said housing, the whole constituting a compact assembly with all of the support bearings therewithin.

ROBERT W. WAGNER.

REFERENCES CITED

The following references are of record in the file of this patent:

UNITED STATES PATENTS

| Number | Name | Date |
| --- | --- | --- |
| 1,191,947 | Clark | July 25, 1916 |
| 1,258,883 | Farmer | Mar. 12, 1918 |
| 1,821,890 | Heck | Sept. 1, 1931 |
| 1,835,449 | Allen | Dec. 8, 1931 |
| 1,975,835 | Farkas | Oct. 9, 1934 |
| 1,999,612 | Larsen et al. | Apr. 30, 1935 |
| 2,062,194 | Smith | Nov. 24, 1936 |
| 2,106,086 | Davey | Jan. 18, 1938 |
| 2,182,386 | Patterson | Dec. 5, 1939 |
| 2,302,509 | Tangen | Nov. 17, 1942 |
| 2,306,767 | Wagner | Dec. 29, 1942 |
| 2,390,513 | Couse | Dec. 11, 1945 |